United States Patent
Lopes De Queiroz et al.

(10) Patent No.: US 11,983,904 B2
(45) Date of Patent: May 14, 2024

(54) METHOD FOR COMPRESSING POINT CLOUDS

(71) Applicant: SAMSUNG ELETRÔNICA DA AMAZÔNIA LTDA., São Paulo (BR)

(72) Inventors: Ricardo Lopes De Queiroz, Brasília (BR); Camilo Chang Dorea, Brasília (BR); Renan Utida Barbosa Ferreira, Brasília (BR); Davi Rabbouni De Carvalho Freitas, Brasília (BR); Diogo Caetano Garcia, Brasília (BR); Rogério Higa, Campinas (BR); Ismael Seidel, Campinas (BR); Vanessa Testoni, Campinas (BR)

(73) Assignee: SAMSUNG ELETRONICA DA AMAZONIA LTDA., Campinas (BR)

( * ) Notice: Subject to any disclaimer, the term of this patent is extended or adjusted under 35 U.S.C. 154(b) by 441 days.

(21) Appl. No.: 17/238,896

(22) Filed: Apr. 23, 2021

(65) Prior Publication Data

US 2022/0108481 A1    Apr. 7, 2022

(51) Int. Cl.
*G06T 9/00* (2006.01)
*G06T 3/40* (2006.01)
*H04N 19/184* (2014.01)
*H04N 19/186* (2014.01)
*H04N 19/30* (2014.01)
*H04N 19/597* (2014.01)
*H04N 19/625* (2014.01)

(52) U.S. Cl.
CPC ............. *G06T 9/001* (2013.01); *G06T 3/40* (2013.01); *H04N 19/184* (2014.11); *H04N 19/186* (2014.11); *H04N 19/30* (2014.11); *H04N 19/597* (2014.11); *H04N 19/625* (2014.11)

(58) Field of Classification Search
None
See application file for complete search history.

(56) References Cited

U.S. PATENT DOCUMENTS

| | | | |
|---|---|---|---|
| 10,262,451 B1 | 4/2019 | Chou et al. | |
| 11,017,566 B1 * | 5/2021 | Tourapis | G06T 9/001 |
| 2019/0043253 A1 | 2/2019 | Lucas et al. | |
| 2020/0244941 A1 | 7/2020 | Schwarz et al. | |
| 2022/0159261 A1 * | 5/2022 | Oh | H04N 21/6379 |

OTHER PUBLICATIONS

Gustavo Sandri, et al., "Compression of Plenoptic Point Clouds Using the Region-Adaptive Hierarchical Transform", ICIP 2018, 5 pages.
Gustavo Sandri, et al., "Compression of Plenoptic Point Clouds", IEEE Transactions on Image Processing, vol. 28, No. 3, Mar. 2019, 9 pages.
Li Li, et al., "Video-based compression for plenoptic point clouds," 2019, 10 pages.
Xiang Zhang, et al., "A Framework for Surface Light Field Compression", ICIP 2018, 5 pages.

* cited by examiner

*Primary Examiner* — Leon Viet Q Nguyen

(57) ABSTRACT

The present invention refers to removal of redundant information from plenoptic point cloud data, reducing the number of bits needed to represent them and thus making the plenoptic point cloud data more suitable to be transferred through a medium of limited bandwidth. The proposed solution is based on predictive differential coding, using the standard color channel of a point clouds as a reference for plenoptic data, and on the application of transforms for greater data compression.

13 Claims, 20 Drawing Sheets

METHOD FOR COMPRESSING POINT CLOUDS

CROSS-REFERENCE TO RELATED APPLICATION(S)

This application is based on and claims priority under 35 U.S.C. § 119 to Brazilian Patent Application No. BR 10 2020 020345-2, filed on Oct. 2, 2020, in the Brazilian Intellectual Property Office, the disclosure of which is incorporated by reference herein in its entirety.

TECHNICAL FIELD

The present invention is related to the encoding of plenoptic point clouds, also called surface light field point clouds, by using a video codec, favoring point clouds technology, since it can reuse the existing implementation of video encoders on mobile devices. The present invention can be implemented in various devices that use point clouds, such as, immersive displays, holographic smartphones, cameras, headphones, AR/VR/MR devices, Smart TV, etc.

BACKGROUND

Point clouds have recently been used in applications involving real-time capture and rendering of 3D objects. The most common representation of a point cloud uses only a single-color associated with each point or voxel. This representation, however, cannot capture the natural reflections of dynamic light of the object realistically. The reflected light can change with the viewing angle, but in the single-color representation all viewing angles have the same value.

A more complete representation, called the plenoptic point cloud, was proposed where each point has an associated color in multiple directions. In the first representation, the point cloud is described as spatial coordinates (XYZ) and color (RGB). For the representation of plenoptic point cloud are also described several color attributes (RGB0, RGB1, RGB2, . . . ).

Therefore, the plenoptic point cloud can have the following information for each cloud voxel/point:

(XYZ RGB RGB0 RGB1 . . . RGB(N-1)), where RGB means a single-color attribute, and RGB(n) means the list of multiple color attributes of size N. This representation preserves the color information dependent on the visualization.

In the regular process of generating point cloud, the information is captured by a series of cameras. The colors captured by these cameras are then combined to produce a single point color, and the view-dependent color information is lost in the process. Therefore, the same capture process can be used to generate the plenoptic point cloud. The view-dependent color information is then preserved using the multiple attributes.

Point clouds are typically represented by extremely large amounts of data, which is a significant barrier to most applications. However, the relative ease of capturing and making spatial information from point clouds compared to other volumetric video representations makes point clouds increasingly popular for presenting immersive volumetric data. Therefore, the MPEG 3DG standardization group has worked for many years to efficiently compress point clouds data and recently released its first standard, called V-PCC (Video-Based Point clouds Compression).

The V-PCC encoder implementation provides compression in the range of 100:1 to 300:1, and therefore a dynamic point clouds of one million points could be encoded at Mbit/s with good quality of perception. Due to this performance, the V-PCC is expected to be successfully adopted in bulk soon.

Although there have been some attempts to compress plenoptic point clouds in the standardization group, the current pattern only supports the compression of the plenoptic point cloud, then treating them as individual attributes. The problem with this approach is that the correlation between plenoptic colors is not explored, avoiding achieving efficient compression. The purpose of this invention is to explore this correlation with a hybrid solution and have it adopted in the V-PCC standard for the compression of the plenoptic point cloud data.

Point clouds are the convergence of visual capture, such as images and videos, and visual synthesis, such as 3D mesh models. In a point clouds instead of a pixel there is a voxel that represents a position in a volumetric space. For each voxel there may be an associated color attribute and this information along with the voxel position is what constitutes a point cloud.

As with images, a point cloud has a resolution given by the number of voxels. A point clouds with 4096×4096×4096 resolution can have up to 68 billion points, but a typical point cloud representing only one object in that resolution has 3 million points. Considering a 60-bit representation per point, the total size is about 23 Mb per frame.

The U.S. patent document U.S. Pat. No. 10,262,451B1 titled "View-Dependent Color Compression", published on Apr. 16, 2019 by 8I LIMITED, intends to compress plenoptic point clouds by exploring the use of a function representation of the display color. Such an invention generates coefficient vectors by calculating a corresponding transform of each visualization map. The main difference is that the present invention uses color attributes for each voxel of a point cloud instead of a representation per function.

The U.S. patent document US2020244941A1 titled "Multi-View Coding With Efficient Residual Handling", published on Jul. 30, 2020, by GE VIDEO COMPRESSION LLC, uses a multi-view coding scheme and explores residual signal prediction from a residual reference signal using prediction offset by granular block disparity. The present invention, however, aims to compress a point clouds view dependent color instead of multi-view images.

The U.S. patent document US2019043253A1 titled "View Dependent 3d Reconstruction Mechanism", published on Feb. 7, 2019, by INTEL CORPORATION, discloses a point clouds compression mechanism that encodes view-dependent colors such as depth, color images, which can use video compression, and camera parameters. The main difference is that the present invention further explores view-dependent color compression by a differential encoder and a transform.

The paper "Compression of plenoptic point clouds using the Region-Adaptive Hierarchical Transform", published in October 2018, by G. Sandri, R. L. de Queiroz, P. A. Chou, presents a method for encoding plenoptic point clouds, represented by multiple color attributes per voxel, using a Karhunen-Loeve transform of the color attributes. The main difference is that this invention uses a projection video-based encoder instead of a geometric hierarchical transform.

The paper "Compression of plenoptic point clouds", published in March 2019, by G. Sandri, R. L. de Queiroz and P. A. Chou, presents a method where the transformed coefficients are encoded using an encoder based on the region-adaptive hierarchical transform (RAHT). The main difference is that the present invention uses a projection video-based encoder instead of a geometric hierarchical transform.

The entry document for MPEG ""[V-PCC] CE2.15 report on Attribute Coding (SLF)" published in July 2019 by D. Naik and S. Schwarz, discloses an implementation of the reference code V-PCC (Test Model Coder-2 or TMC-2) in which each voxel can be associated with various attributes and all are encoded by a V-PCC codec extension. The main difference is that the present invention uses differential coding and a transform to further process the multiple color attributes.

The entry document for MPEG "[V-PCC] SLF optimisations" published in July 2020, by D. Naik and S. Schwarz, shows that a processing is applied to multiple color attributes to maintain five color attributes while the rest is discarded. Then the lost attributes are rebuilt on the decoder side through an interpolation. The main difference is that the present invention uses differential coding and a transform in color attributes.

The article "Video-based compression for plenoptic point clouds" published in 2019, by L. Li, Z. Li, S. Liu and H. Li, uses the MULTI-VIEW HEVC (MV-HEVC) extension to encode the attributes of multiple colors as if they were multiple visualizations of the same object. The main difference from the present invention is that it uses a video compression supported by the video-based point clouds compression pattern.

The article "A framework for surface light field compression", published in October 2018, by X. Zhang, P. A. Chou, M.-T. Sun, M. Tang, S. Wang, S. Ma, and W. Gao, presents a method for encoding plenoptic point clouds using a B-Spline wavebase representation of visualization colors. The main difference is that the present invention uses multiple color attributes for each voxel of a dot cloud.

SUMMARY

The present invention refers to the removal of redundant information from the plenoptic point cloud data, reducing the number of bits needed to represent them and thus making the plenoptic point cloud data more suitable to be transferred through a limited bandwidth medium. In addition, the proposed solution uses the default color channel of a point cloud as a reference for the plenoptic data and a transform.

Furthermore, plenoptic point clouds are compressed by exploring a hybrid approach that uses:

differential coding of plenoptic color attributes with the main color attribute as reference;

a transform to further compress the data representation; and the scaling so that the transformed data can be fit to any bit image representation to be compressed by a video encoder.

Differential coding is also adopted to reduce the value range of the data, which makes the data more compressible by the transform step. Several types of transform can be used, such as KLT (Karhunen-Loeve Transform), DST (Discrete Sine Transform), DCT (Discrete Cosine Transform), or Hadamard transform.

The transform can also have a different size than the number of attributes being encoded. In this case, a technique is applied to adjust the size of the transform to the size of the data, such as padding. The scaling step maps the reach of the transformed data to the range supported by the video encoder. The number of video bitstreams sent to point clouds compressed bitstream may be different from the number of attributes, which allows for a quality control.

Another advantage is the reuse of information already encoded by a video-based point clouds compression. This is done by using differential encoding when the single-color attribute is used as a reference.

Another advantage is that it also simplifies compatibility with the previous version of a video-based point clouds codec by adding an extra processing block without changing the core of the codec.

Another advantage of the present invention is the use of a transform to represent the data in a more compact representation and the use of appropriate sizing techniques according to each characteristic of the transform coefficient making it more suitable for any video codec.

The greatest advantage of the present invention is the use of a hybrid technique that exploits differential coding and the transform, which in combination leads to large savings in a cloud bitstream size of plenoptic points, allowing a simple compatibility mode between a single attribute and encoders of various attributes. Compatibility is achieved because differential encoding uses the single-color attribute as a reference. Therefore, this feature also simplifies backward compatibility with a video-based point clouds codec by adding only one extra processing block without changing the core of the codec.

BRIEF DESCRIPTION OF DRAWINGS

The objectives and advantages of the present invention will become clearer through the following detailed description of the example and non-limiting drawings presented at the end of this document.

DETAILED DESCRIPTION

Figure 1:
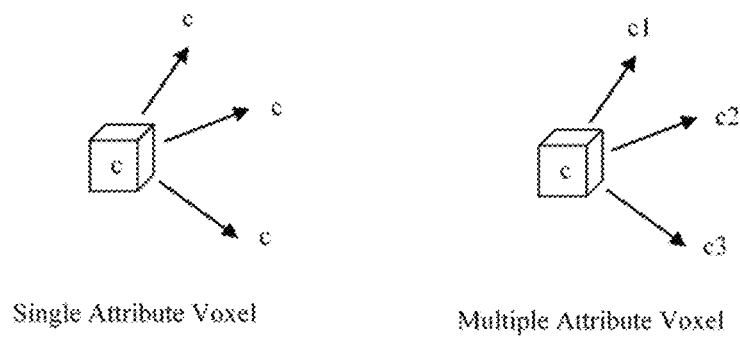
FIG. 1 illustrates the difference between a plenoptic or multiple attribute voxel and a usual single attribute voxel.

FIG. 1 illustrates the difference between a plenoptic or multiple attribute voxel and a usual single attribute voxel. For the multiple attribute voxel, each direction has a different attribute value instead of a single value for all directions. The number of attributes in plenoptic point clouds is usually more than 12 colors per voxel, or 36 attribute components (3 components for each color: red, green, and blue). The usual point clouds with a single attribute already has a huge size, the plenoptic point cloud increases the data size problem by at least one digit. However, there are benefits in representing these plenoptic point clouds, since they can better represent specular materials and give a more realistic appearance to rendered objects.

Figure 2:
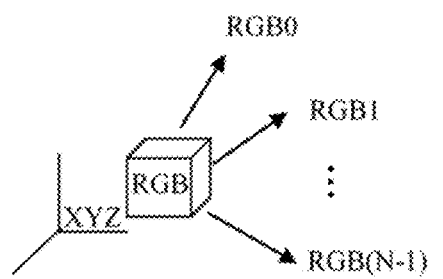
FIG. 2 presents the set of information stored by the plenoptic point cloud.

As illustrated in FIG. 2, the plenoptic point cloud has the following information:
Geometry (XYZ)—the position in the voxel space
Main color attribute (RGB)—the single-color attribute
Plenoptic color attributes RGB0, RGB1, . . . , RGBN-1, for N cameras—multiple color attributes.

Therefore, the problem being faced is how to explore the correlation between the different data visualization points and provide an efficient compression method for the plenoptic point cloud. The current V-PCC standard supports an implementation where each voxel can be associated with multiple attributes, however the plenoptic point cloud data is currently supported by the standard, but not compressed efficiently.

The present invention compresses the plenoptic point cloud exploring a hybrid approach that:
uses differential coding of plenoptic color attributes with the main color attribute as reference; the use of a transform to further compress the representation of data; and
uses scaling so that transformed data can be embedded in any bit image representation to be compressed by a video encoder.

In this sense, a technique for compression of point clouds is proposed, comprising:
project multiple color attributes onto images;
convert the signal to the transform domain;
scale the signal according to the characteristics of the transformed domain signal and the capacity of the video codec;
fill empty spaces of the transformed signal to further improve the performance of video codecs;
encode the signal using a video compression technique.

In addition, in a preferred embodiment, it also includes between the steps of projecting color attributes into images and converting the signal into a transform domain:
use a reference color encoded as the main color attribute that can be decoded independently; And
differential encoding of multiple color attributes using the main color attribute as a reference.

Figure 3A:
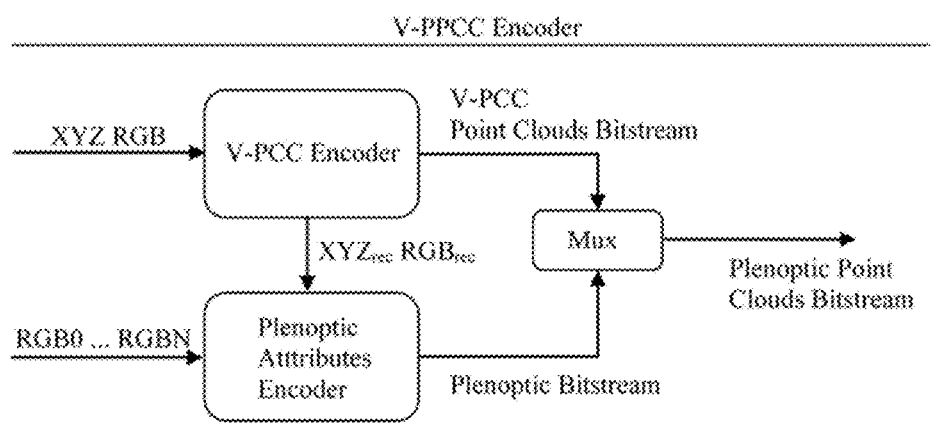
FIG. 3A depicts a simplified visualization of the encoder of the present invention.

FIG. 3 shows a simplified view of the proposed solution. In FIG. 3A, the position and single attribute parameters are sent to the standard V-PCC Encoder, while the multiple attributes are sent to the Plenoptic Attribute Encoder of the present invention.

The V-PCC Encoder and the Plenoptic Attribute Encoder bitstreams are merged to construct a single Plenoptic Point clouds bitstream.

Figure 3B:
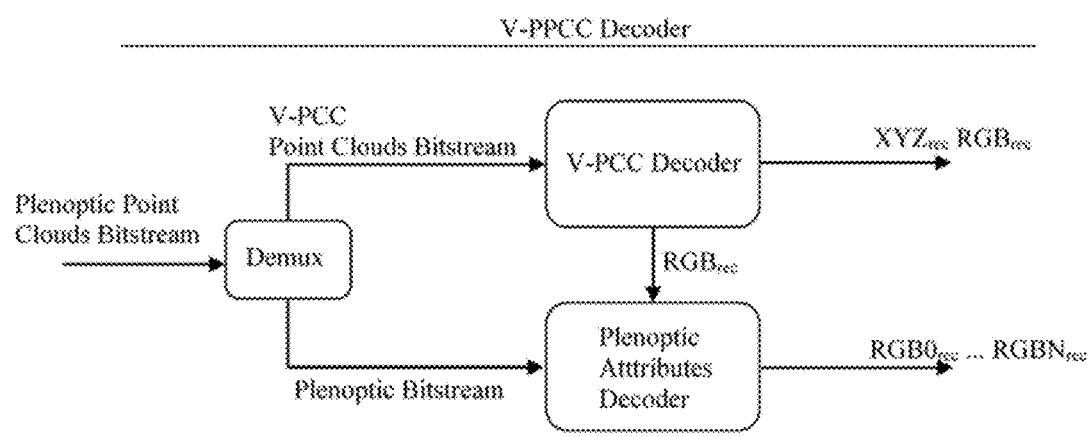
FIG. 3B illustrates a simplified visualization of the decoder of the present invention.

The decoder, shown in FIG. 3B, takes the bitstream from the plenoptic point cloud and causes the reverse process to separate into two bitstreams again. These bitstreams are sent to the V-PCC Decoder and the Plenoptic Attribute Decoder, which reconstructs the geometry and color information of the original point clouds, and the information of multiple color attributes.

Figure 4:
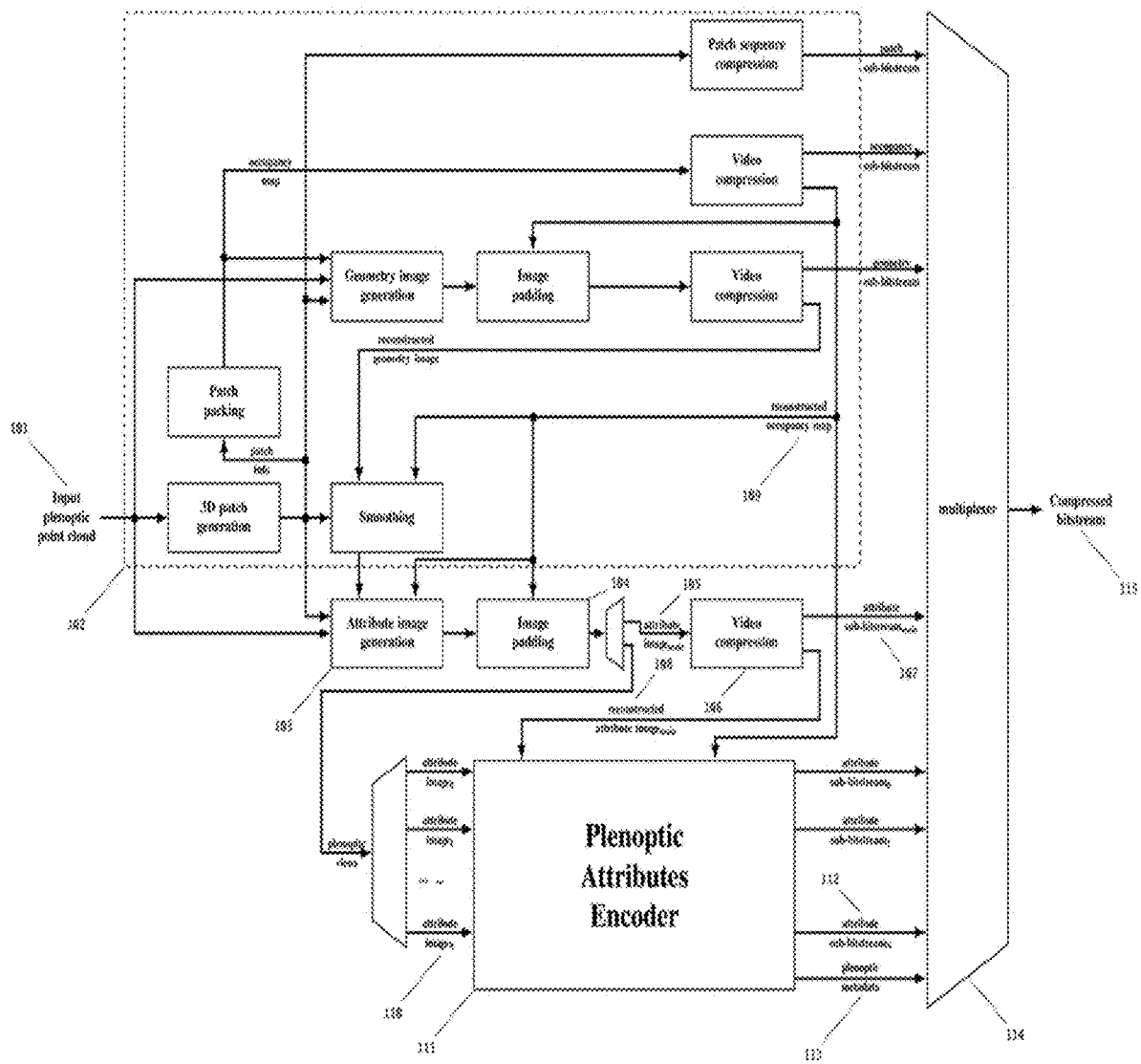
FIG. 4 presents an expanded view of the V-PCC encoder with the plenoptic point cloud encoder.

FIG. 4 illustrates the encoder part of the compression method of the plenoptic point cloud proposed in this invention. The plenoptic point cloud are considered as input (101). This entry is inserted into a video-based point clouds encoder (102), such as V-PCC. Where geometry information is encoded as projection images and sent to a video encoder, along with auxiliary information. A similar projection is used for the color information in the attribute generation image step (103).

The main image of the attribute is processed using an image padding technique (104) that fills the empty space between valid information to generate an image suitable for video compression. The reconstructed occupancy map (109) is used by image padding to locate empty space and is sent to the plenoptic attribute encoder.

Projected color information is separated into main image attributes (105) and plenoptic attributes image (110). The video compression encoder (106) compresses the filled image generating the main attribute sub-bitstream (107) that is sent to the multiplexer (114) and embedded in the compressed bitstream (115). Reconstructed attributes main images (108) and plenoptic attribute images (110) are sent to the Plenoptic Attribute Encoder (111), which generates the attribute sub-bitstreams (112) and the plenoptic metadata (113). The sub-bitstreams attributes and plenoptic metadata are sent to the multiplexer (114) to be embedded in the compressed bitstream (115).

In addition, the projection of color attributes in images can be performed in RGB, YUV or any other color space.

Figure 5:
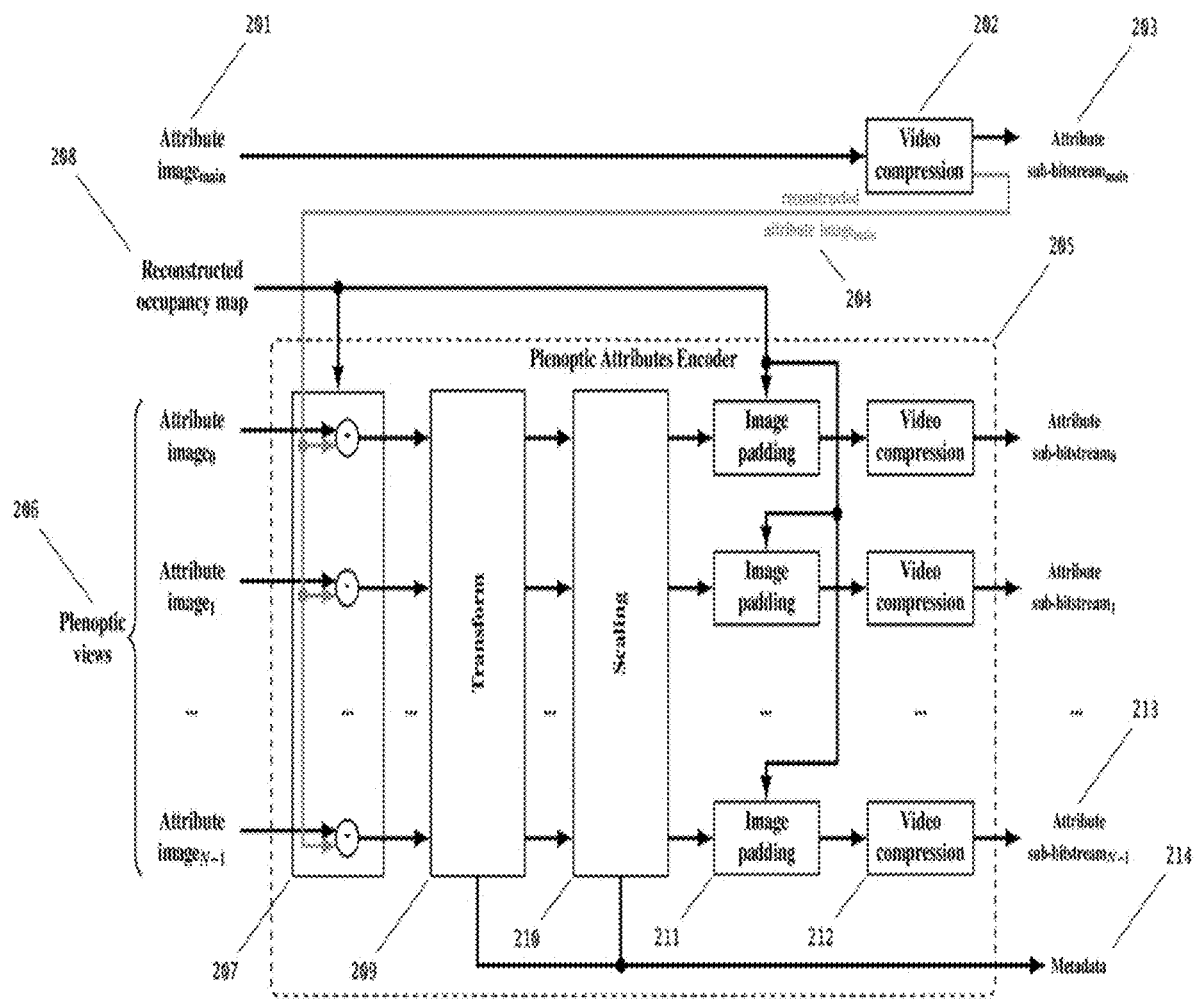
FIG. 5 depicts an expanded view of the Plenoptic Attribute Encoder.

FIG. 5 depicts an expanded view of the Plenoptic Attribute Encoder (110). The main attribute image (201) is the same as the main attribute image (105) described in FIG. 4. Such main attribute image goes through a video compression (202) generating the main attributes sub-bitstream (203).

The reconstructed attribute main image (204) is the equivalent image being retrieved in the decoder. This compensates for any errors that the video compression process may insert into main color information. The differential encoder (207) within the plenoptic attribute encoder (205) uses the main reconstructed attribute image (204) and the plenoptic visualization attributes images (206) to generate differentiated images. Then the transform (209) converts the differential images into a compact representation of information.

The process of converting the signal to a transform domain can use Discrete Cosine Transform (DCT), Hadamard transform, Karhunen-Loeve Transform (KLT), or identity transform, equivalent to a transform block deviation.

Scaling (210) performs mapping to the range supported by video compression, from 0 to 255 in the case of an 8-bit video encoder. A next step of sum of 128 or half of the supported range is added to the scaling process, depending on the type of transformed coefficient being generated.

These transformed images then go through an image padding process (211) to generate an appropriate image for video compression.

Video compression (212) generates the plenoptic attributes sub-bitstreams (213). Also, transform and scaling metadata (214) is also sent to the compressed bitstream. The reconstructed occupancy map (208) can be used by the differential encoder to ignore the values in unoccupied pixels and is used by image padding.

Figure 6:
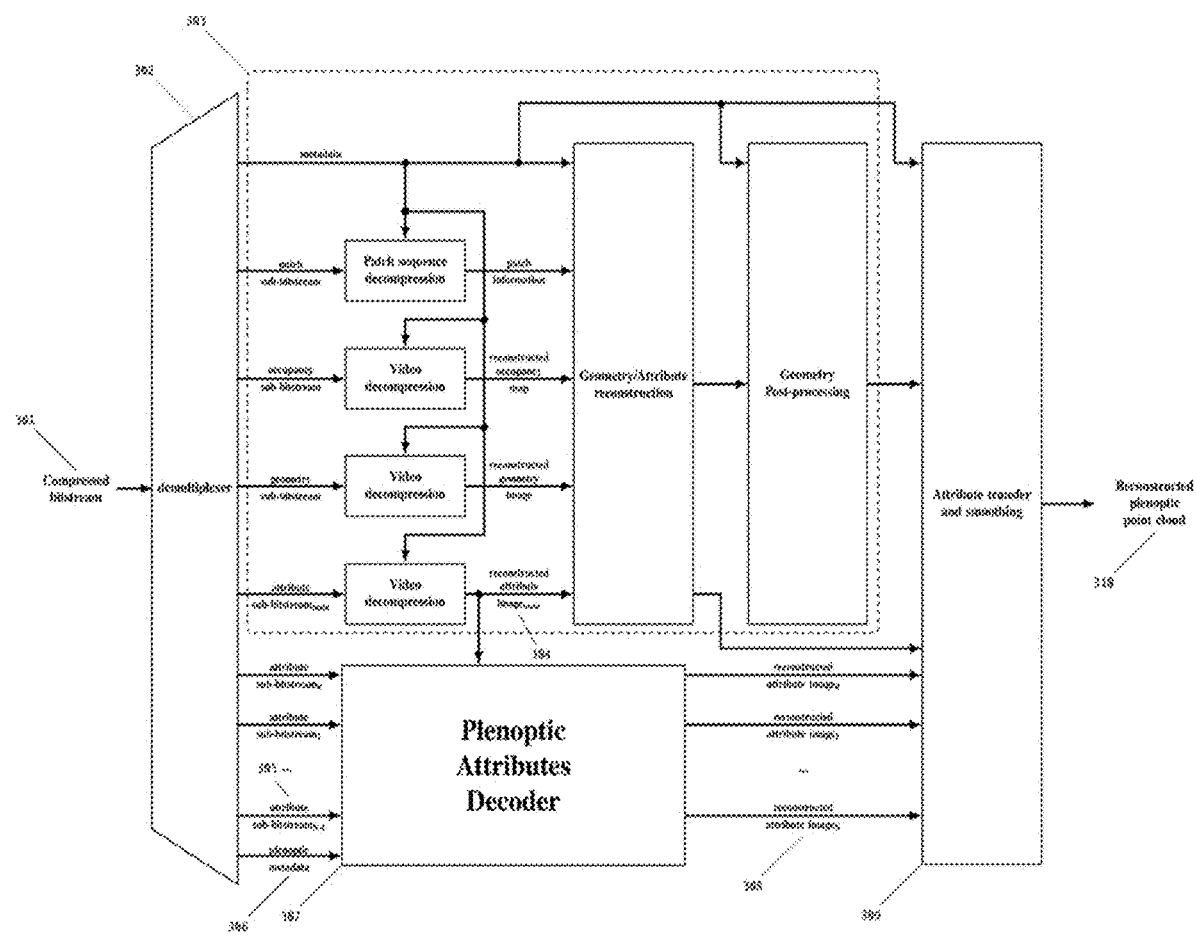
FIG. 6 presents an expanded view of the V-PCC decoder with the plenoptic point cloud decoder.

In addition, FIG. 6 depicts the decoding part of the compression method of the plenoptic point clouds proposed here. The compressed bitstream (301) passes through a demultiplexer (302), generating sub-bitstreams and metadata. The plenoptic attribute decoder (307) receives as input the visualizations of the plenoptic sub-bitstreams (305) and the plenoptic metadata (306) that generate the reconstructed attribute images (308). Attribute transfer and smoothing block (309) ta(309) takes the geometry of the video-based point clouds decoder (303) and reconstructs the plenoptic visualization colors with the reconstructed attribute images (308) generating the reconstructed plenoptic point cloud (310).

Figure 7:
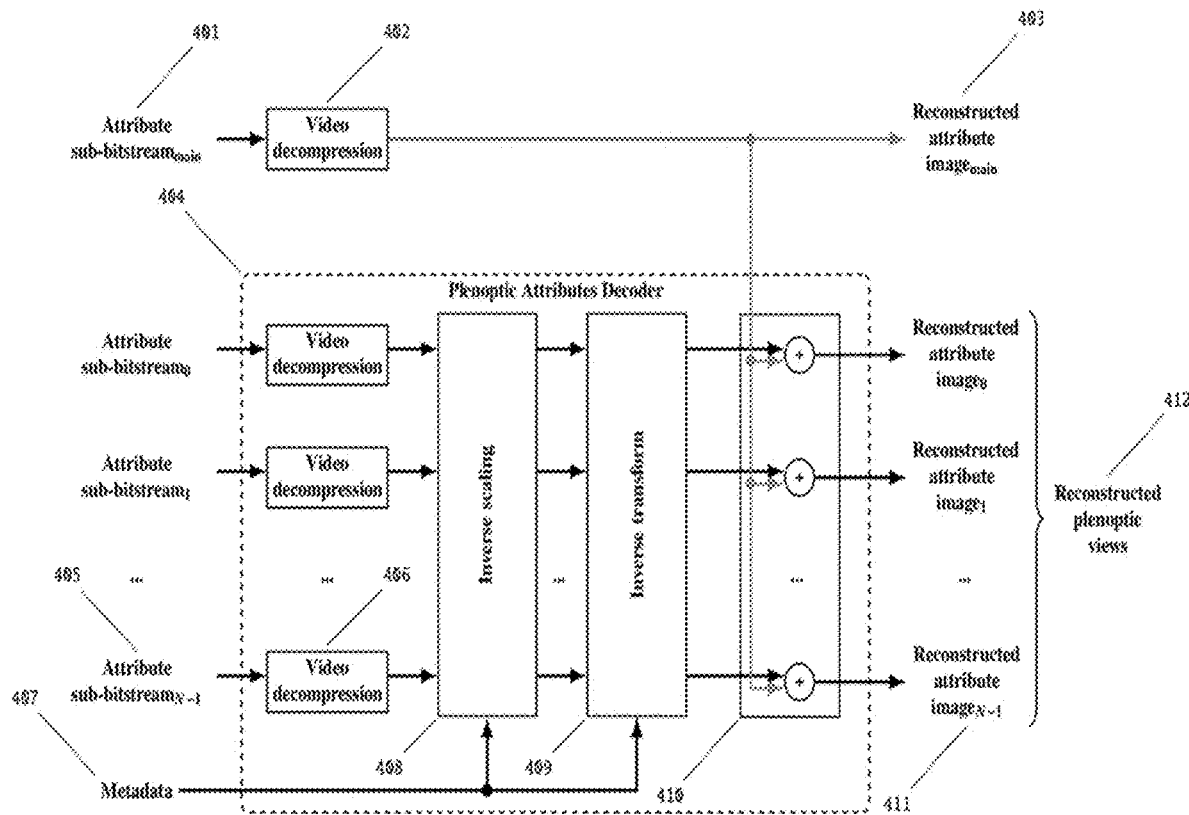
FIG. 7 illustrates an expanded view of the Plenoptic Attribute Decoder.

FIG. 7 depicts an expanded view of the Plenoptic Attribute Decoder (307). The main attribute sub-bitstreams (401) are decoded using video decompression (402) generating the main reconstructed attribute image (403). Video decompression (406) decodes attribute sub-bitstreams (405). Reverse scaling (408) using plenoptic metadata information (407) is images that remap the values to the range of the transform used. The inverse transform (409) returns the data to the differential encoder format, which is added to the reconstructed attribute image main (403) generating the reconstructed attribute images (411). Reconstructed plenoptic visualizations (412) are passed to the video-based point clouds decoder for complete reconstruction of the plenoptic point cloud.

When the transform size is larger than the size of multiple color attributes a fill method is applied to make the attribute data compatible with the transform size.

In addition, the number of attribute sub-bitstreams can be any size according to the desired quality. Unused attribute subs-bitstreams are discarded.

In addition, the scale of positive and negative values is symmetric, that is, the positive and negative values are scaled by the same factor.

Figure 8:
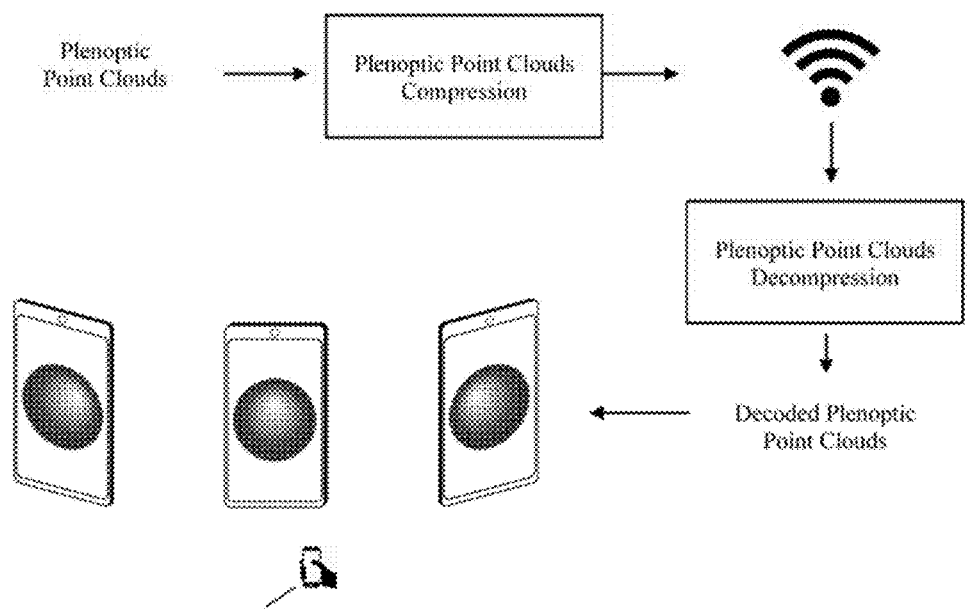
FIG. 8 presents a preferred embodiment of the present invention consisting of a device with AR/VR/MR capabilities.

FIG. 8 depicts a preferred embodiment of the present invention consisting of a device with AR/VR/MR capabilities, where the data from plenoptic point clouds are decoded to be presented on the device. Plenoptic point clouds (501) are compacted by a computing device (502) using techniques proposed in this invention. The compressed representation is suitable for being transmitted by a network device. On the receiver side, a computing device with the decoder presented in this invention performs decompression to restore the plenoptic point clouds (504). Restored plenoptic point clouds (505) can be read and displayed by an AR device (506). The user (507) can switch interactively to a different viewing point than the 3D object on the display (508).

Figure 9:
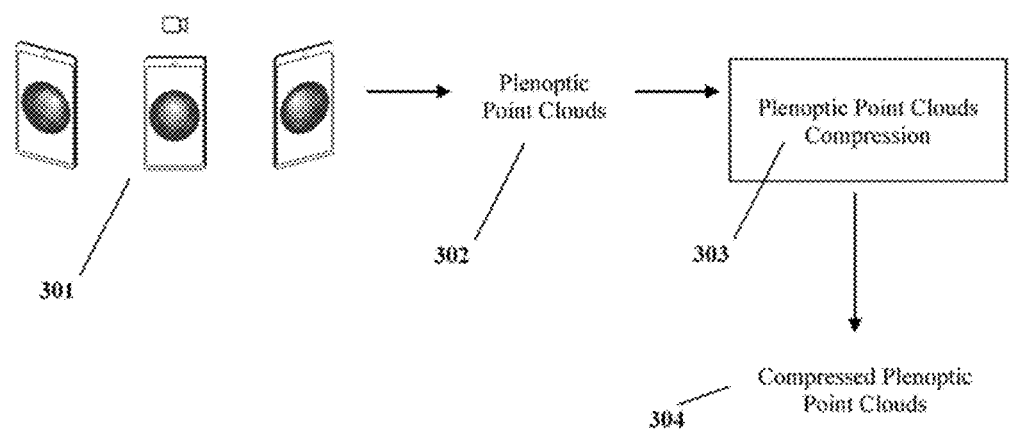
FIG. 9 illustrates an alternative embodiment of the present invention consisting of a capture device (601).
Figure 10:
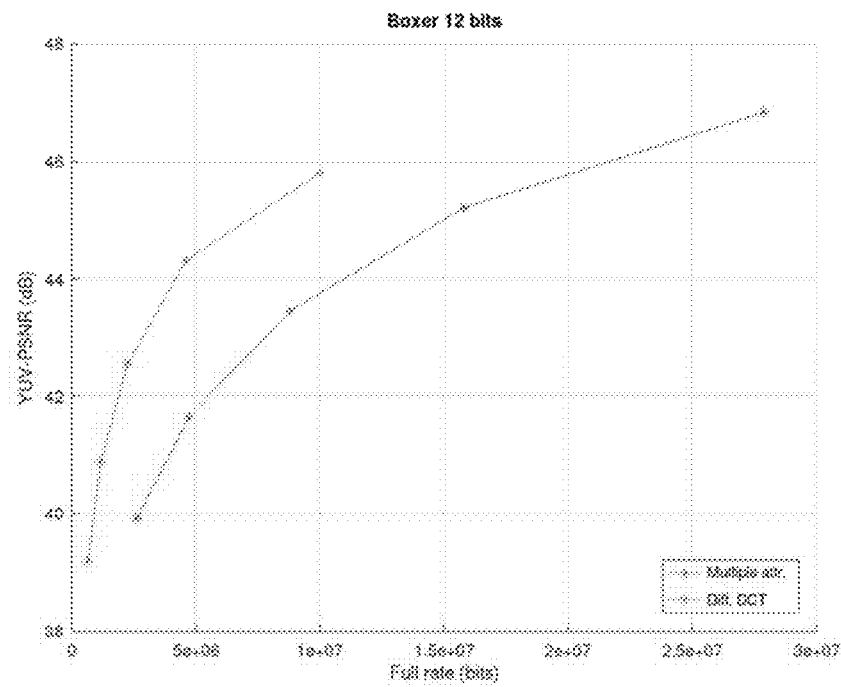
FIGS. 10 to 14 depict a comparison between graphs representing the quality of other solutions compared to the present invention for configurations with 12-bits sequences, when encoding N+1 color attributes.
Figure 11:
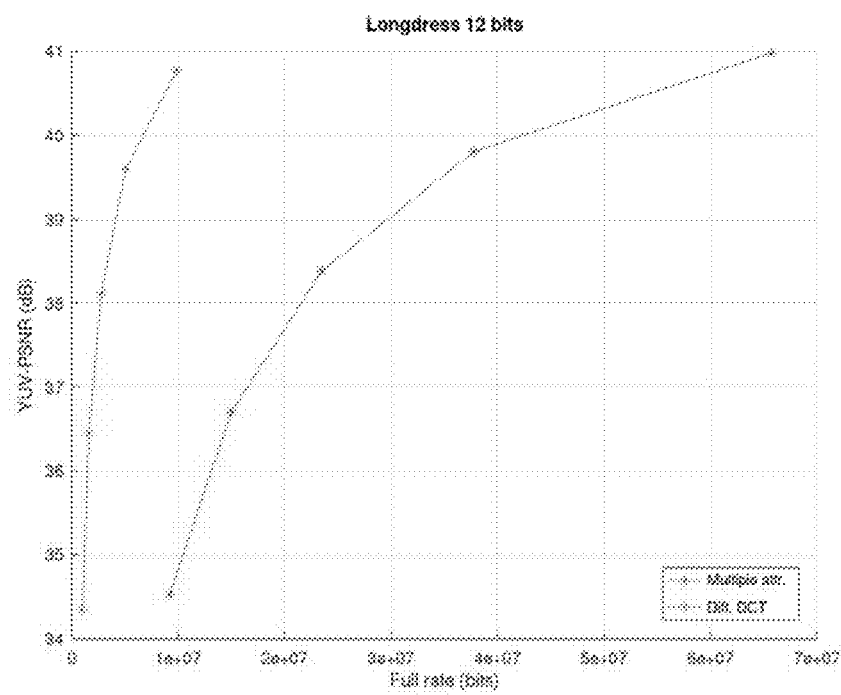
Figure 12:
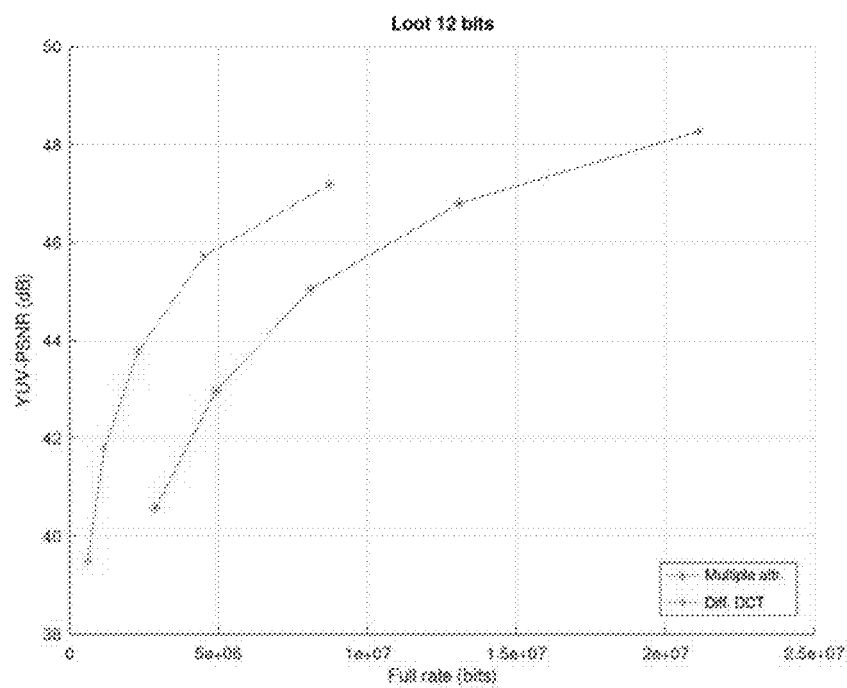
Figure 13:
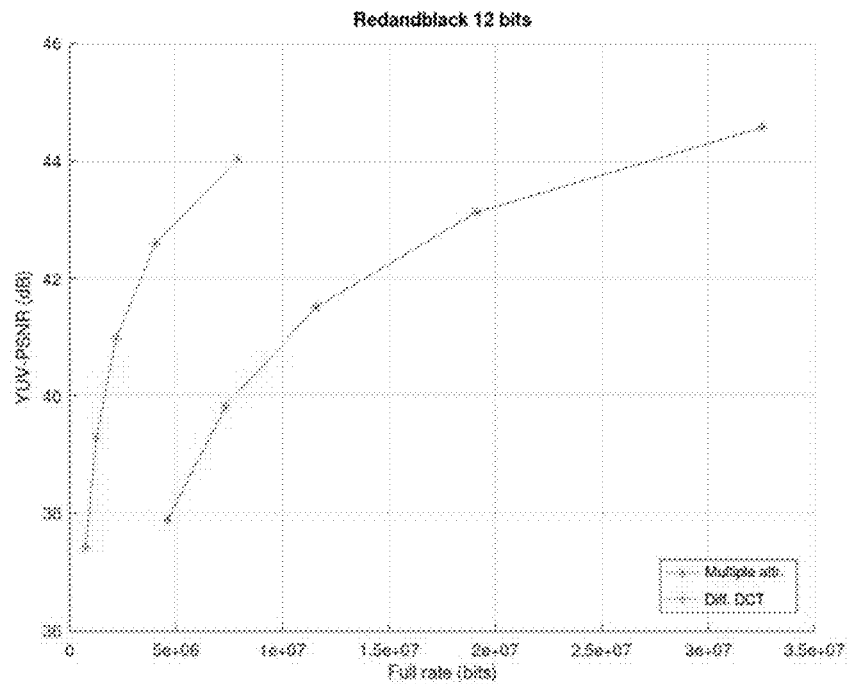
Figure 14:
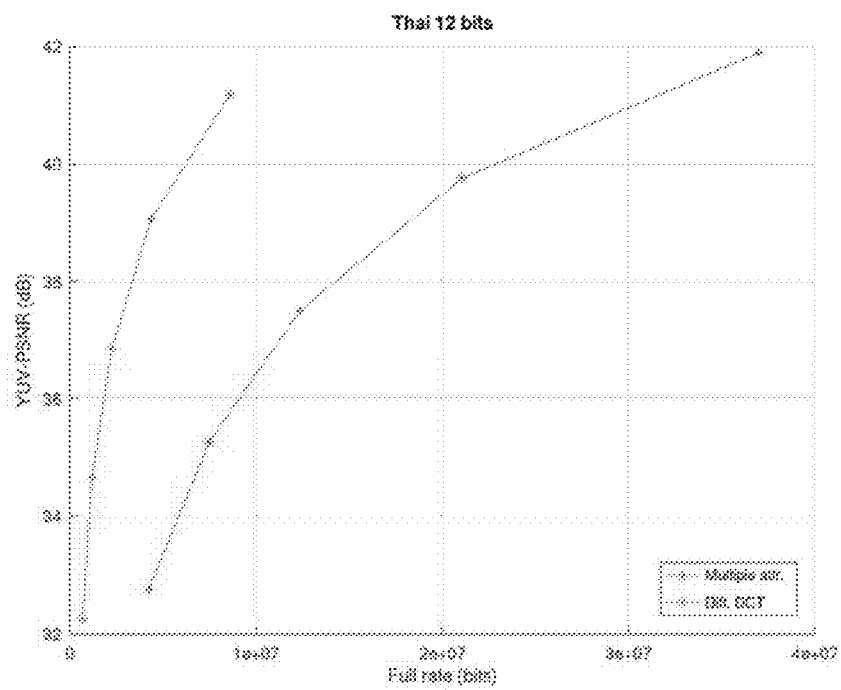
Figure 15:
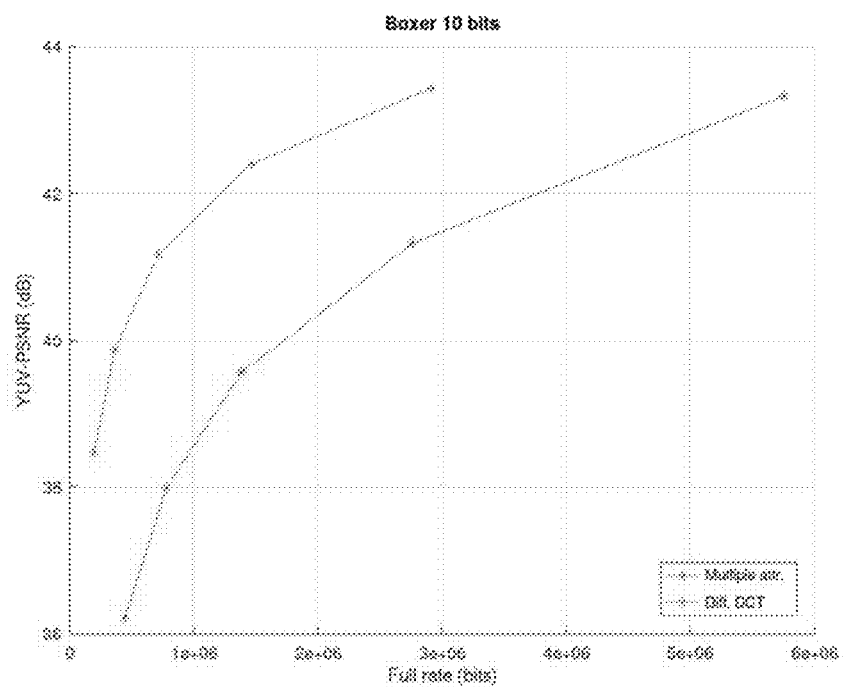
FIGS. 15 to 19 depict a comparison between graphs representing the quality of the other solutions in view of the present invention for configurations with 10-bit sequences, when encoding N+1 color attributes.
Figure 16:
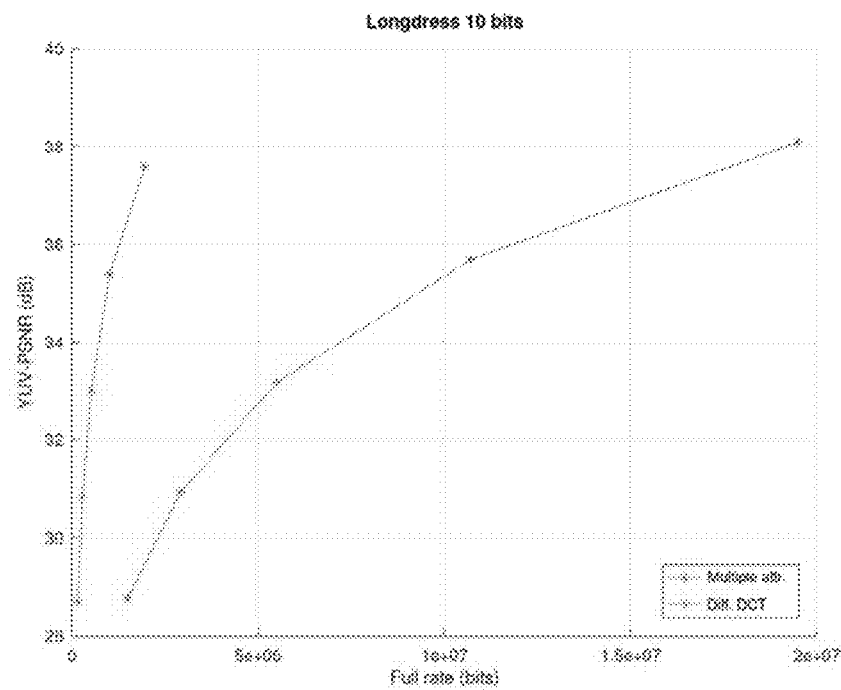
Figure 17:
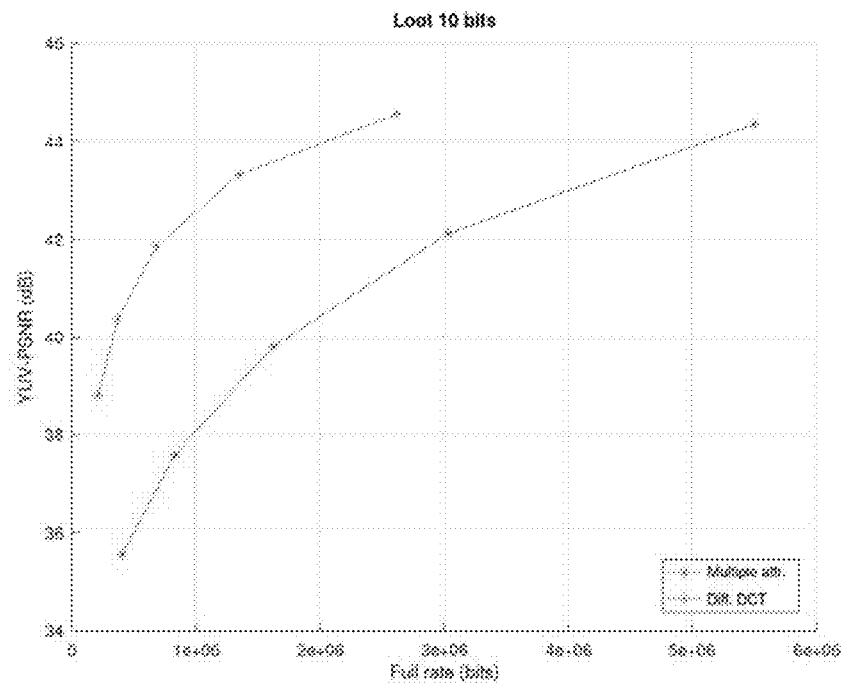
Figure 18:
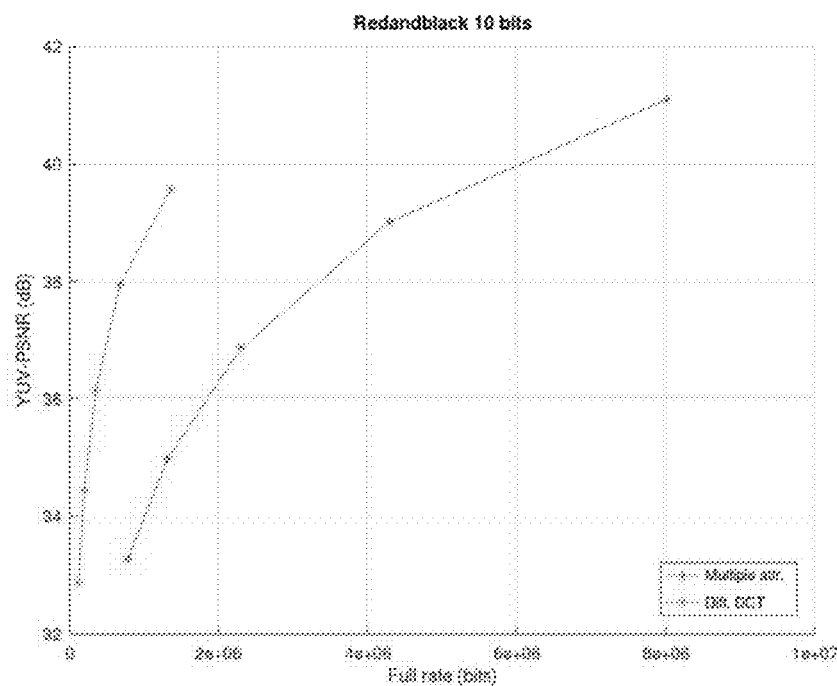
Figure 19:
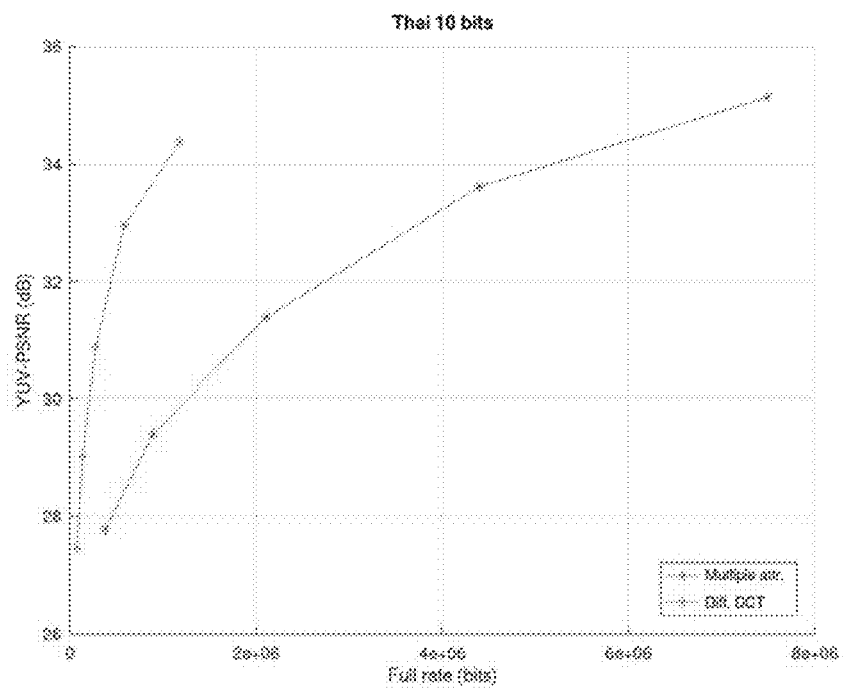
Figure 20:
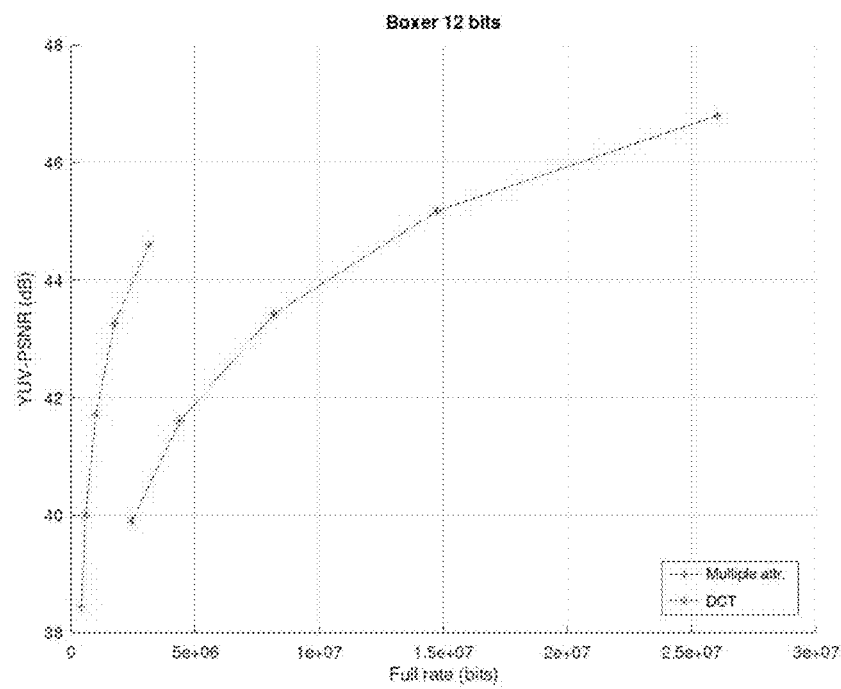
FIGS. 20 to 24 depict a comparison between graphs representing the quality of other solutions compared to the present invention for configurations with 12-bits sequences, when encoding N color attributes and creating the main RGB.
Figure 21:
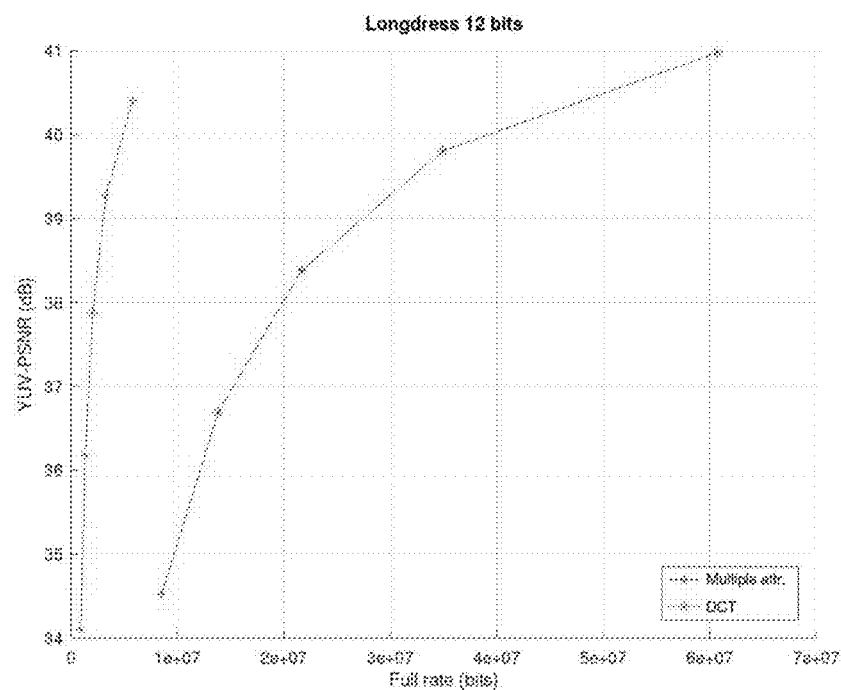
Figure 22:
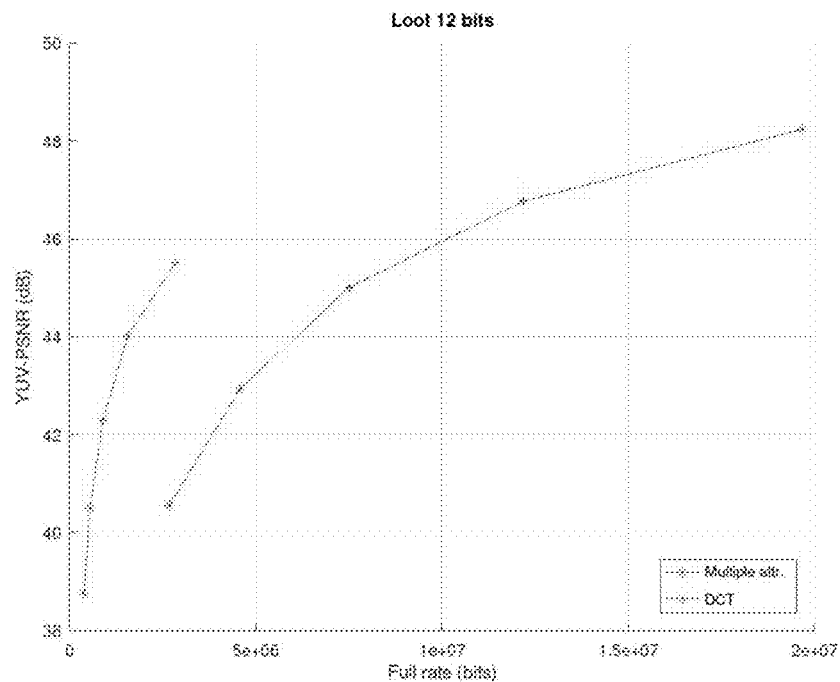
Figure 23:
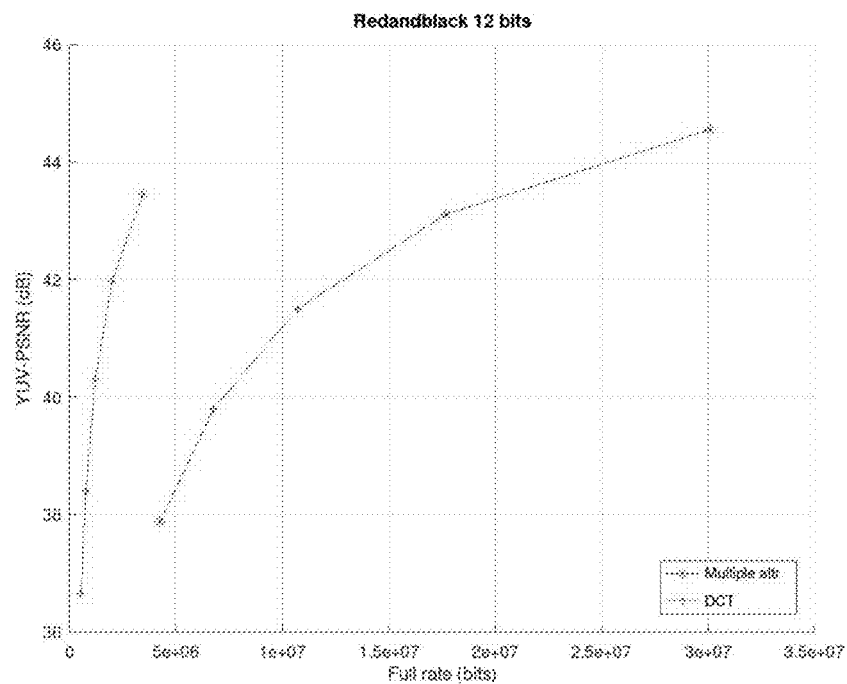
Figure 24:
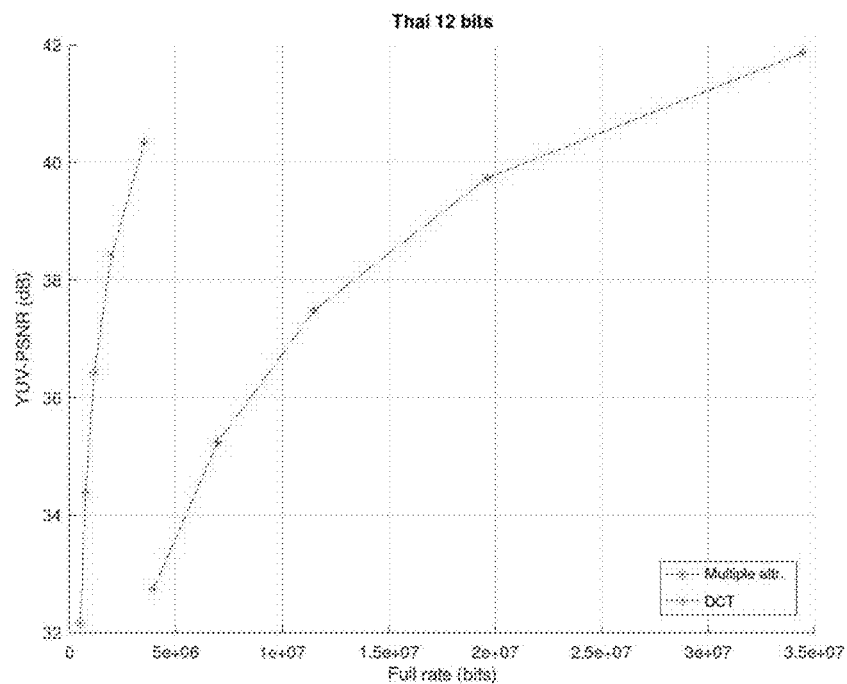
Figure 25:
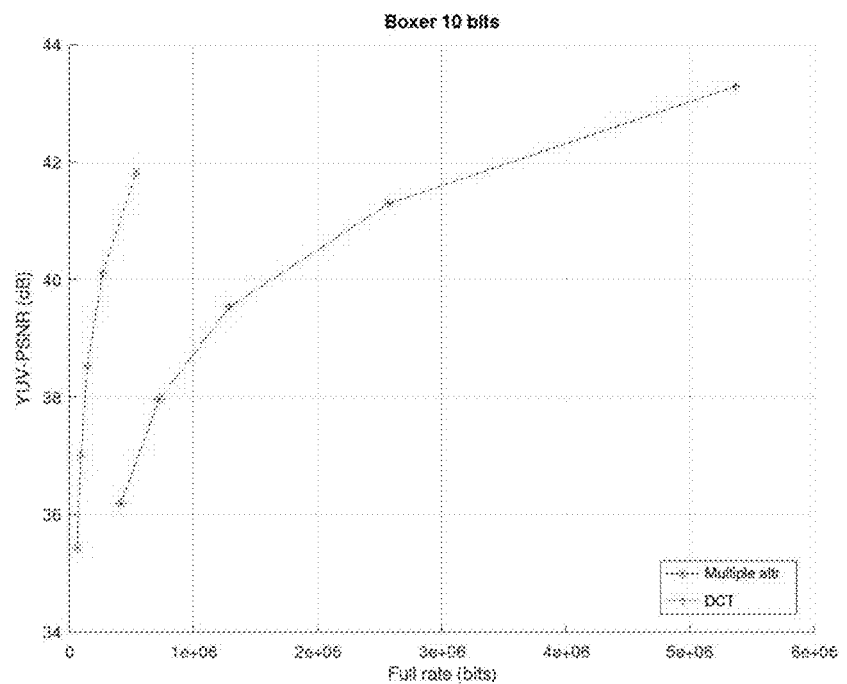
FIGS. 25 to 29 depict a comparison between graphs representing the quality of the other solutions in view of the present invention for configurations with 10-bit sequences, when encoding N color attributes and creating the main RGB.
Figure 26:
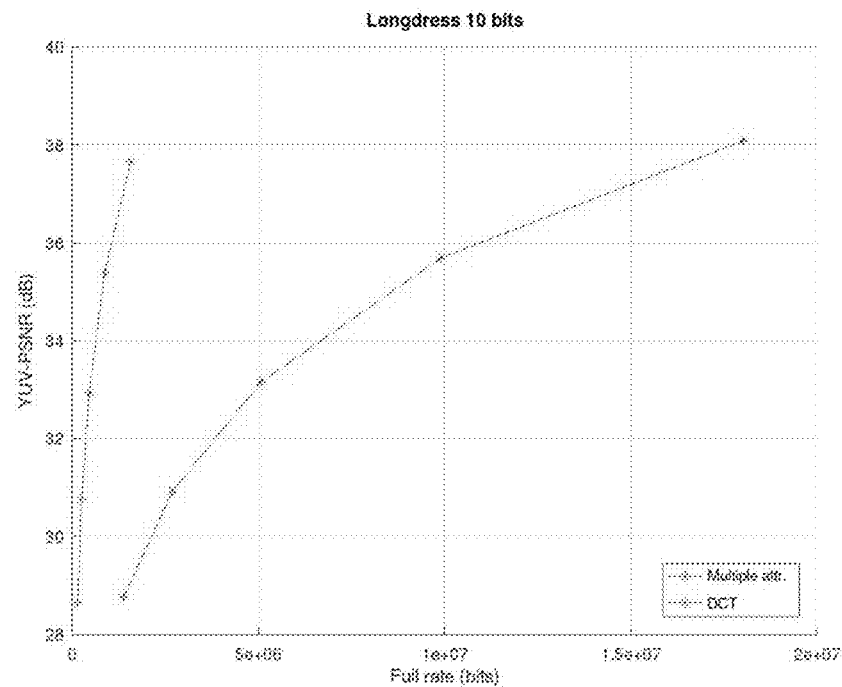
Figure 27:
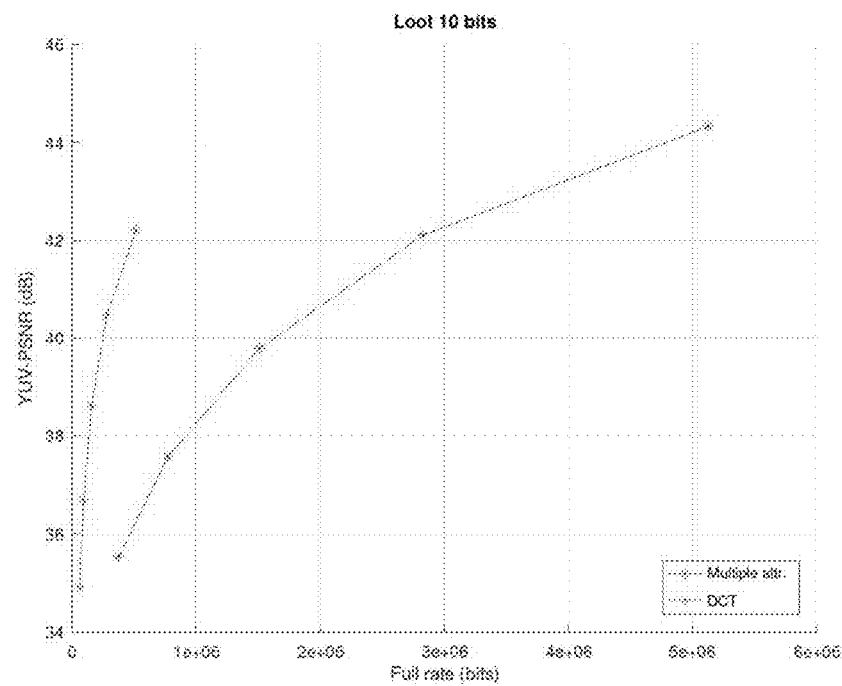
Figure 28:
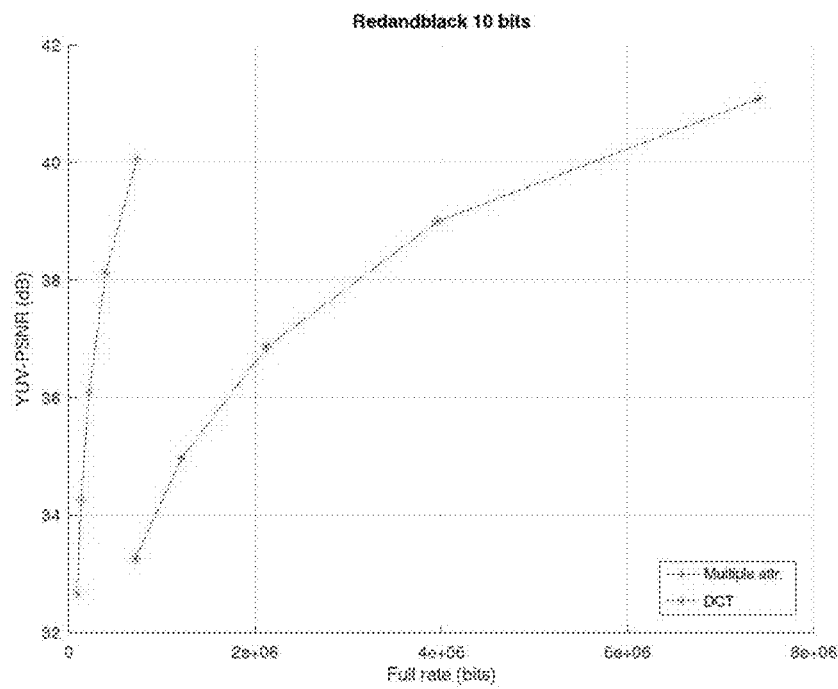
Figure 29:
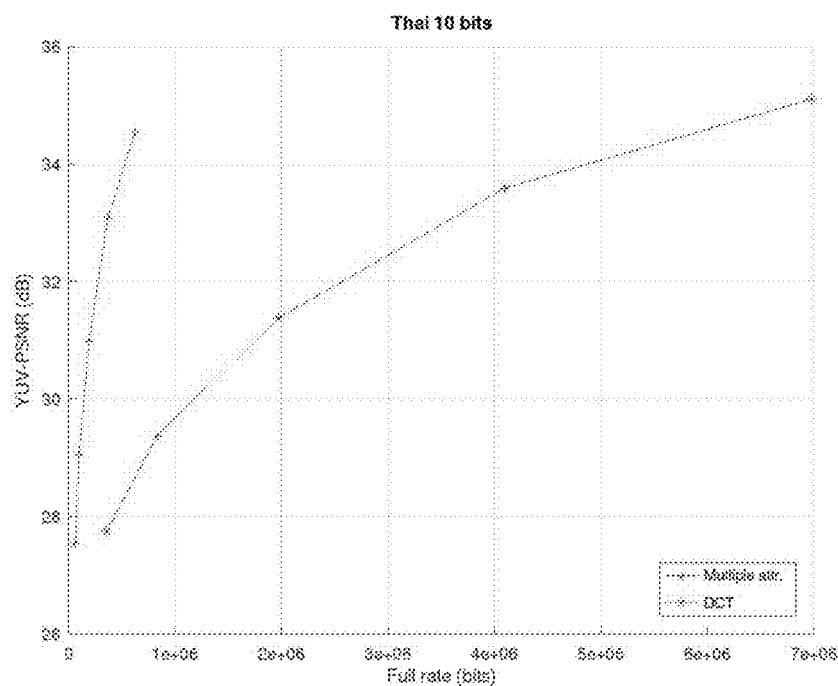

FIG. 9 illustrates an alternative embodiment of the present invention consisting of a capture device. This device can acquire data with multiple cameras or a camera device that scans the object moving around it. The captured digital representation is a plenoptic point cloud (602). The plenoptic point clouds (602) are compacted by a computing device associated with the capture device using techniques proposed in this invention (603). The compressed representation is suitable for storage on the device (604).

As an exemplary embodiment, in order to encode N+1 color attributes, it is assumed that there is a point cloud with XYZ geometry, RGBmain colors and N other color attributes RGB0, RGB1, RGBN-1. XYZ and RGBmain are the main payload and must be encoded using V-PCC using QP=QPmain. RGBn is the plenoptic color information to be encoded using the differential encoder and the transform block.

This example was implemented on TMC2v9.0 and compared with the current solution supported by the V-PCC, that is, encoding the plenoptic information as multiple point cloud attributes. Both methods were tested over the original 8i VSLF (12 bits) and its reduced resolution versions (10 bits) using default TMC2 parameter values (C2-AI). The rate was calculated as the sum of the bit rates of the encoded main and plenoptic RGB information. The distortion was calculated as the Peak Signal-to-Noise Ratio (PSNR) between the original and the decoded main and plenoptic RGB information, where everything was considered as a single signal instead of averaging the PSNRs across cameras.

Since rate includes the Y, Cb (U) and Cr (V) channels, the final PSNR value was calculated as the weighted sum of the PSNRs of these channels, that is, PSNR=(6 $PSNR_Y$+$PSNR_U$+$PSNR_V$)=8.

The results for one frame in all-intra configuration are shown in FIGS. 10 to 14, where the configuration tested here is represented as "Diff. DCT", and the anchor is represented as "Multiple attr". The same tests were made for the reduced-resolution versions (10-bit) of the 8i VSLF dataset, as shown in FIGS. 15 to 19. In this sense, Table 1 presents the BD-rates for the same curves comparisons and datasets.

TABLE 1

| Sequence name | BD-rate (%) |
| --- | --- |
| Boxer 12 bits | −63.52% |
| Boxer 10 bits | −72.25% |
| Longdress 12 bits | −87.47% |
| Longdress 10 bits | −89.89% |
| Loot 12 bits | −61.00% |
| Loot 10 bits | −75.84% |
| Redandblack 12 bits | −77.74% |
| Redandblack 10 bits | −80.51% |
| Thai 12 bits | −78.61% |
| Thai 10 bits | −82.80% |

Moreover, if there is no main RGB color to be encoded then the differential coder has no effect, as the minus input would be zero. And the DC component generated by the transform is used as the main RGB, saving one video stream payload.

This was also implemented on top of TMC2v9.0 and compared against encoding the plenoptic information as multiple point cloud attributes, over the original 8i VSLF (12 bits) and its reduced-resolution versions (10 bits) using default TMC2 parameter values (C2-AI).

Results for one frame in all-intra configuration are shown in Pictures 20 to 24, where the configuration tested here is represented as "DCT", and the anchor is represented as "Multiple attr.". In this scenario, there is no main RGB color to be encoded, so that for both methods the rate was calculated as the sum of the bit rates of the plenoptic RGB information, and the distortion as the weighted YUV PSNR between the original and the decoded plenoptic RGB information, all taken as a single signal instead of averaging PSNRs across cameras. The same tests were made for the reduced-resolution versions of the 8i VSLF dataset (10 bits), as shown in Pictures 25 to 29. Table 2 presents BD-rates for the same curves comparisons and datasets.

TABLE 2

| Sequence name | BD-rate (%) |
|---|---|
| Boxer 12 bits | −77.45% |
| Boxer 10 bits | −83.42% |
| Longdress 12 bits | −88.95% |
| Longdress 10 bits | −90.29% |
| Loot 12 bits | −75.40% |
| Loot 10 bits | −84.40% |
| Redandblack 12 bits | −84.03% |
| Redandblack 10 bits | −86.96% |
| Thai 12 bits | −86.59% |
| Thai 10 bits | −88.14% |

The testing for the plenoptic point cloud (PPC) encoding scheme using V-PCC (on top of TMC2v9.0) achieves compression gains above 70% for all the sequences in the 8i VSLF dataset (for both original and reduced-resolution versions). These gains refer to the all-intra configuration with one frame when compared to the coding of the plenoptic information as multiple point cloud attributes (coding all texture independently). Additional advantages are the backwards compatibility with the single-view V-PCC and the constant quality of reconstructed camera views, since any view is discarded.

Although the present invention has been described in connection with certain preferential embodiments, it should be understood that it is not intended to limit disclosure to such particular embodiments. Instead, it is intended to cover all possible alternatives, modifications and equivalents within the spirit and scope of the invention, as defined by the attached claims.

What is claimed is:

1. A method of compressing point clouds comprising:
   inserting plenoptic point clouds into a video-based point clouds encoder, where geometry information is encoded as projection images and sent to a video encoder along with auxiliary information;
   processing a main attribute image using an image padding technique that fills an empty space between valid information to generate an image suitable for video compression;
   using a reconstructed occupancy map to locate the empty space and filling attribute images;
   sending plenoptic attribute images to a Plenoptic Attribute Encoder;
   separating color information projected into the main attribute image and the plenoptic attribute images;
   compressing, by a video compression encoder, the filled image generating a main attribute sub-bitstream that is sent to a multiplexer and embedded in a compressed bitstream;
   sending a main reconstructed attribute image and plenoptic visualization attribute images to the Plenoptic Attribute Encoder;
   generating attribute sub-bitstreams and plenoptic metadata;
   sending the attribute sub-bitstreams and the plenoptic metadata to the multiplexer to be embedded in the compressed bitstream; and
   executing a processing by the Plenoptic Attribute Encoder, the processing including:
      using, by a differential encoder, a reconstructed attribute image and the plenoptic visualization attribute images to generate differential images,
      using a transform to convert the differential images into a compact representation of information,
      scaling the compact representation of information to perform mapping to a range supported by video compression,
      image padding the scaled compact representation of information to generate appropriate images for video compression,
      compressing the appropriate images to generate plenoptic attributes sub-bitstreams, and
      sending metadata generated by the transform and scaling to the compressed bitstream.

2. The method according to claim 1, wherein the method further comprises:
   adding a sum of or half of the range supported to a process of the scaling, depending on a type of transform coefficient being generated.

3. The method according to claim 1, further comprising:
   converting a signal to a transform domain using the Discrete Cosine Transform.

4. The method according to claim 1, further comprising:
   converting a signal to a transform domain using the Hadamard transform.

5. The method according to claim 1, further comprising:
   converting a signal to a transform domain using the Karhunen-Loeve Transform.

6. The method according to claim 1, further comprising:
   converting a signal to a transform domain using identity transform, equivalent to a transform block bypass.

7. The method according to claim 1, wherein when a transform size is larger than a size of multiple color attributes, an image fill is applied to make attribute data compatible with the transform size.

8. The method according to claim 1, wherein a number of sub-bitstreams attributes include any size according to a desired quality.

9. The method according to claim 8, wherein sub-bitstreams of unused attributes are discarded.

10. The method according to claim 1, wherein scale of negative and positive values is mathematically symmetrical according to characteristics of a signal of a transformed domain.

11. The method according to claim 9, wherein certain transform coefficients have a sum of half of added representation range.

12. The method according to claim 1, wherein projection of color attributes in images is done in RGB color space.

13. The method according to claim 1, wherein projection of color attributes in images is done in YUV color space.

* * * * *

UNITED STATES PATENT AND TRADEMARK OFFICE
CERTIFICATE OF CORRECTION

| | |
|---|---|
| PATENT NO. | : 11,983,904 B2 |
| APPLICATION NO. | : 17/238896 |
| DATED | : May 14, 2024 |
| INVENTOR(S) | : Ricardo Lopes De Queiroz et al. |

It is certified that error appears in the above-identified patent and that said Letters Patent is hereby corrected as shown below:

On the Title Page

Column 1, Prior Publication Date, below "Apr. 7, 2022" insert Item (30) -- (30) Foreign Application Priority Data Oct. 2, 2020 (BR) ..................... 10 2020 020345 2 --.

Signed and Sealed this
First Day of October, 2024

Katherine Kelly Vidal
*Director of the United States Patent and Trademark Office*